(12) United States Patent
Haren

(10) Patent No.: US 6,557,060 B1
(45) Date of Patent: Apr. 29, 2003

(54) DATA TRANSFER IN HOST EXPANSION BRIDGE

(75) Inventor: Ken C. Haren, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/557,217

(22) Filed: Apr. 25, 2000

(51) Int. Cl.[7] ............................................. G06F 13/00
(52) U.S. Cl. .................... 710/65; 710/4; 710/11; 710/33; 710/34; 710/36; 710/65; 707/100
(58) Field of Search ................... 710/4, 11, 33, 710/34, 36, 65; 707/100

(56) References Cited

U.S. PATENT DOCUMENTS 5,574,923 A * 11/1996 Heeb et al. .................. 710/65
6,286,005 B1 * 9/2001 Cannon ...................... 707/100
6,480,913 B1 * 11/2002 Monteiro ..................... 710/65

* cited by examiner

Primary Examiner—Jeffrey Gaffin
Assistant Examiner—Mohammad O. Farooq
(74) Attorney, Agent, or Firm—Antonelli, Terry, Stout & Kraus, LLP

(57) ABSTRACT

Data is converted from a first granularity to a second granularity different from the first granularity. The ratio "n" of the second granularity of the data to the first granularity of the data is determined as a power of 2. The least significant n bits of the beginning alignment of the data are added to the least significant n bits of the beginning count of the data, and the carry bit of the sum is designated as "c". A logical "OR" is performed of the bits of the resulting sum to obtain a value designated as "d". A number of data units, equal to the sum of "c" and "d", is added to the data.

8 Claims, 9 Drawing Sheets

FIG. 4A

| | | | | | | | | | |
|---|---|---|---|---|---|---|---|---|---|
| CLOCK 3 | 17 | 16 | 15 | 14 | 13 | 12 | 11 | 10 | REGISTERED |
| | X | X | X | X | X | X | X | X | BYPASS |
| CLOCK 2 | F | E | D | C | B | A | 9 | 8 | REGISTERED |
| | 17 | 16 | 15 | 14 | 13 | 12 | 11 | 10 | BYPASS |
| CLOCK 1 | 7 | 6 | 5 | 4 | 3 | 2 | 1 | 0 | REGISTERED |
| | F | E | D | C | B | A | 9 | 8 | BYPASS |
| CLOCK 0 | X | X | X | X | X | X | X | X | REGISTERED |
| | 7 | 6 | 5 | 4 | 3 | 2 | 1 | 0 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

FIG. 4B

| | | | | | | | | | |
|---|---|---|---|---|---|---|---|---|---|
| CLOCK 3 | 11 | 10 | 17 | 16 | 15 | 14 | 13 | 12 | REGISTERED |
| | X | X | X | X | X | X | X | X | BYPASS |
| CLOCK 2 | 9 | 8 | F | E | D | C | B | A | REGISTERED |
| | 11 | 10 | 17 | 16 | 15 | 14 | 13 | 12 | BYPASS |
| CLOCK 1 | 1 | 0 | 7 | 6 | 5 | 4 | 3 | 2 | REGISTERED |
| | 9 | 8 | F | E | D | C | B | A | BYPASS |
| CLOCK 0 | X | X | X | X | X | X | X | X | REGISTERED |
| | 1 | 0 | 7 | 6 | 5 | 4 | 3 | 2 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

FIG. 4C

| | | | | | | | | | |
|---|---|---|---|---|---|---|---|---|---|
| CLOCK 3 | 12 | 11 | 10 | 17 | 16 | 15 | 14 | 13 | REGISTERED |
| | X | X | X | X | X | X | X | X | BYPASS |
| CLOCK 2 | A | 9 | 8 | F | E | D | C | B | REGISTERED |
| | 12 | 11 | 10 | 17 | 16 | 15 | 14 | 13 | BYPASS |
| CLOCK 1 | 2 | 1 | 0 | 7 | 6 | 5 | 4 | 3 | REGISTERED |
| | A | 9 | 8 | F | E | D | C | B | BYPASS |
| CLOCK 0 | X | X | X | X | X | X | X | X | REGISTERED |
| | 2 | 1 | 0 | 7 | 6 | 5 | 4 | 3 | BYPASS |
| BYTE LANE | 7 | 6 | 5 | 4 | 3 | 2 | 1 | 0 | |
| | 7 | 6 | 5 | 4 | 3 | 2 | 1 | 0 | FIFO LINE 0 |
| | F | E | D | C | B | A | 9 | 8 | FIFO LINE 1 |
| | 17 | 16 | 15 | 14 | 13 | 12 | 11 | 10 | FIFO LINE 2 |

FIG. 7

| CASE # | c | d | IMPLICATION |
|---|---|---|---|
| 1 | 0 | 0 | THIS INDICATES THAT BOTH ENDS OF THE STREAM ARE NATURALLY ALIGNED WITH THE FINAL GRANULARITY<br>$e=0$ |
| 2 | 0 | 1 | THIS INDICATES THAT BOTH ENDS OF THE STREAM ARE MIS-ALIGNED WITH THE FINAL GRANULARITY AND THAT THE SUM OF THE BEGINNING UNITS THAT OVERLAP THE ENDS OF THE STREAM IS EQUAL TO OR GREATER THAN THE ENDING GRANULARITY<br>$e=1$ |
| 3 | 1 | 0 | THIS INDICATES THAT THE STREAM STARTS MIS-ALIGNED WITH THE ENDING GRANULARITY BUT ENDS ALIGNED<br>$e=1$ |
| 4 | 1 | 1 | THIS INDICATES THAT BOTH ENDS OF THE STREAM ARE MIS-ALIGNED WITH THE FINAL GRANULARITY AND THAT THE SUM OF THE BEGINNING DATA UNITS THAT OVERLAP THE ENDS OF THE STREAM IS LESS THAN THE ENDING GRANULARITY<br>$e=2$ |

FIG. 8A

| | | | | | | | BEGIN ALIGNMENT 00b | |
|---|---|---|---|---|---|---|---|---|
| | dword 2 | | | dword 1 | | | dword 0 | |
| | | | x | x | x | x | x | x | x | x |

BEGINNING GRANULARITY = 1 (I.E., BYTE)
ENDING GRANULARITY = 4 (I.E., dword)
BEGINNING COUNT = 1000 (BINARY)
BEGINNING ALIGNMENT = 00 (BINARY)
$n = \log_2(EG/BG) = \log_2 4 = 2$
$s = BA(n-1:0) + BC(n-1:0) = BA(1:0) + BC(1:0) = 00 + 00 = 00$ BINARY
$c$ = CARRY BIT FROM s CALCULATION = 0
$d = s(n-1:0)$ OR $s(0) = s(1)$ OR $s(0) = 0$ OR $0 = 0$
$e = c + d = 0 + 0 = 0$
EC = (BC WITH THE LEAST SIGNIFICANT n BITS TRUNCATED) + $e$ = 10b + 0b = 10b = 2 DECIMAL

FIG. 8B

| | | | | | | | BEGIN ALIGNMENT 00b | |
|---|---|---|---|---|---|---|---|---|
| | dword 2 | | | dword 1 | | | dword 0 | |
| | | | | x | x | x | x | x | x |

BEGINNING GRANULARITY = 1 (I.E., BYTE)
ENDING GRANULARITY = 4 (I.E., dword)
BEGINNING COUNT = 0110 (BINARY)
BEGINNING ALIGNMENT = 01 (BINARY)
$n = \log_2(EG/BG) = \log_2 4 = 2$
$s = BA(n-1:0) + BC(n-1:0) = BA(1:0) + BC(1:0) = 01 + 10 = 11$ BINARY
$c$ = CARRY BIT FROM s CALCULATION = 0
$d = s(n-1:0)$ OR $s(0) = s(1)$ OR $s(0) = 0$ OR $1 = 1$
$e = c + d = 0 + 1 = 1$
EC = (BC WITH THE LEAST SIGNIFICANT n BITS TRUNCATED) + $e$ = 01b + 1b = 10b = 2 DECIMAL

FIG. 8C

| | | | | | | | BEGIN ALIGNMENT 00b | |
|---|---|---|---|---|---|---|---|---|
| | dword 2 | | | dword 1 | | | dword 0 | |
| | | | x | x | x | x | x | x | x |

BEGINNING GRANULARITY = 1 (I.E., BYTE)
ENDING GRANULARITY = 4 (I.E., dword)
BEGINNING COUNT = 0111 (BINARY)
BEGINNING ALIGNMENT = 01 (BINARY)
$n = \log_2(EG/BG) = \log_2 4 = 2$
$s = BA(n-1:0) + BC(n-1:0) = BA(1:0) + BC(1:0) = 01 + 11 = 00$ BINARY
$c$ = CARRY BIT FROM s CALCULATION = 1
$d = s(n-1:0)$ OR $s(0) = s(1)$ OR $s(0) = 0$ OR $0 = 0$
$e = c + d = 1 + 0 = 1$
EC = (BC WITH THE LEAST SIGNIFICANT n BITS TRUNCATED) + $e$ = 01b + 1b = 10b = 2 DECIMAL

FIG. 8D

| | | | | | | | BEGIN ALIGNMENT 00b | | |
|---|---|---|---|---|---|---|---|---|---|
| | dword 2 | | | | dword 1 | | | dword 0 | |
| | | | | X | X | X | X | X | X | X | | |

BEGINNING GRANULARITY = 1 (I.E., BYTE)
ENDING GRANULARITY = 4 (I.E., dword)
BEGINNING COUNT = 0111 (BINARY)
BEGINNING ALIGNMENT = 10 (BINARY)
$n = \log_2(EG/BG) = \log_2 4 = 2$
$s = BA(n1:0) + BC(n-1:0) = BA(1:0) + BC(1:0) = 10 + 11 = 01$ BINARY
$c$ = CARRY BIT FROM s CALCULATION = 1
$d = s(n-1:0)$ OR $s(0) = s(1)$ OR $s(0) = 0$ OR $1 = 1$
$e = c + d = 1 + 1 = 2$ DECIMAL = 10 BINARY
EC = (BC WITH THE LEAST SIGNIFICANT n BITS TRUNCATED) + $e$ = 01b + 10b = 11b = 3 DECIMAL

DATA TRANSFER IN HOST EXPANSION BRIDGE

BACKGROUND

1. Field of the Invention

This invention relates generally to the transfer of data between a host processing device and a network connection. In particular, the present invention relates to methods for transferring data in a host expansion bridge between a network connection and a host interface or bus.

2. Description of the Related Art

Many computer systems, such as workstations or personal computers (PCs) with a Pentium® microprocessor processing device (manufactured by Intel Corporation), typically use Peripheral Component Interconnect (PCI) buses as an interconnect transport mechanism to transfer data between different internal components, such as one or more processors, memory subsystems and input/output (I/O) devices including, for example, keyboards, input mouses, disk controllers, serial and parallel ports to printers, scanners, and display devices. The PCI buses are high performance 32 or 64 bit synchronous buses with automatic configurability and multiplexed address, control and data lines as described in the latest version of *"PCI Local Bus Specification, Revision 2.2"* set forth by the PCI Special Interest Group (SIG) on Dec. 18, 1998. Currently, the PCI architecture provides the most common method used to extend computer systems for add-on arrangements (e.g., expansion cards) with new video, networking, or disk memory storage capabilities.

When PCI buses are used to transfer data in a host processing system such as a server, bridges may be provided to interface and buffer transfers of data between the processor, the memory subsystem, the I/O devices and the PCI buses. Examples of such bridges may include PCI—PCI bridges as described in detail in the *"PCI—PCI Bridge Architecture Specification, Revision 1.1"* set forth by the PCI Special Interest Group (SIG) on Apr. 5, 1995. However, the performance of such a host processing system may be burdened by the demands of I/O devices to access processors and memory locations of the processing system during data transfer operations.

When connected to a network, host processing systems may need to be able to serve as a source (initiator) system which initiates a data transfer or as a destination (target) system which participates in a data transfer initiated by another system. Furthermore, the data traffic on a network is usually quite asynchronous and unpredictable. Each physical link of the network may support a number of logical channels. Each channel may be a bidirectional communication path allowing commands and data to flow between a processing system and the network. The data may be transmitted across the network in packet form, often in organized groups of packets according to various communication protocols and often through intermediate nodes.

Each processing system connected to the network has a network interface which acts as the communications intermediary between the asynchronous network traffic and its own, usually synchronous I/O subsystems. In a host processing system, such as a server, there may be a large amount of data storage and communications functionality and the demand for access to the system may be complex. Typically, data transfers between a processing system and a network are highly asynchronous and the bit size of the payload data on the network may not be the same as the bit sizes for host processors, memory subsystems, I/O subsystems, PCI devices behind or on one side of a host bridge such as a PCI—PCI bridge, etc. As a result transfer operations over a PCI bus or other synchronous I/O subsystem may not be optimized for network data, and the wait time for processing data transferred over the network may be unnecessarily lengthened.

Unlike PCI and other I/O buses, some host processor interfaces and host buses require, at the beginning of a data transfer, to know how much data is associated with the transfer. The amount of data must be specified for the specific naturally aligned granularity of the host processor interface and/or bus. In many cases, the hardware of the network interface does not operate at the same alignment and/or granularity as the host bus and it would be convenient to have a simple efficient mechanism for converting data length counts between granularities and aligning the data. Accordingly, there is a need for a scalable solution for converting data bytes received from a network communication link into naturally aligned data formats and pre-counting the data to make it ready for a host processor or bus.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

FIGS. 4A–4C illustrate the transfer of data from the virtual interface expansion bridge to the host processor of the host processing system in the example embodiment shown in FIG. 3.

FIG. 7 is an explanation of the four possible results of the algorithm of the second example embodiment in FIG. 6.

FIGS. 8A–8D show the application of the algorithm in the second example embodiment illustrated in FIG. 6 to four different data examples.

DETAILED DESCRIPTION

While example embodiments are described herein, the present invention is applicable for use with all types of computer networks, I/O hardware adapters and chipsets, including follow-on chip designs which link together such disparate processing systems as computers, servers, peripherals, storage devices, and devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), Infiniband or other channel based, switched fabric architecture. LAN networks may include versions of Ethernet, FDDI (Fiber Distributed Date Interface), Token Ring, Asynchronous Transfer Mode (ATM), Fiber Channel and Wireless. However, for the sake of simplicity, discussions will concentrate mainly on an NGIO or Infiniband networks having several example nodes (e.g., computers, servers and I/O units) interconnected by corresponding links and switches, although the scope of the present invention is not limited thereto. A wide variety of implementations, arrangements and configurations of devices (e.g., host systems and I/O units), switches and links in all types of data networks may be possible.

According to an example embodiment or implementation, the various devices connected to the network may utilize channel adapters compatible with the NGIO specifications, Version 1.0, published by the NGIO forum on or about Jul. 20, 1999 or with the Infiniband specifications developed by the Infiniband Trade Association (www.infinibandta.org). The network consists of a channel-based switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the HCA and the TCA may be broadly considered as fabric adapters provided to interface endpoints to the NGIO switched fabric, and may be implemented in compliance with the NGIO specification for enabling the endpoints (nodes) to communicate to each other over an NGIO channel (s).

Figure 1:
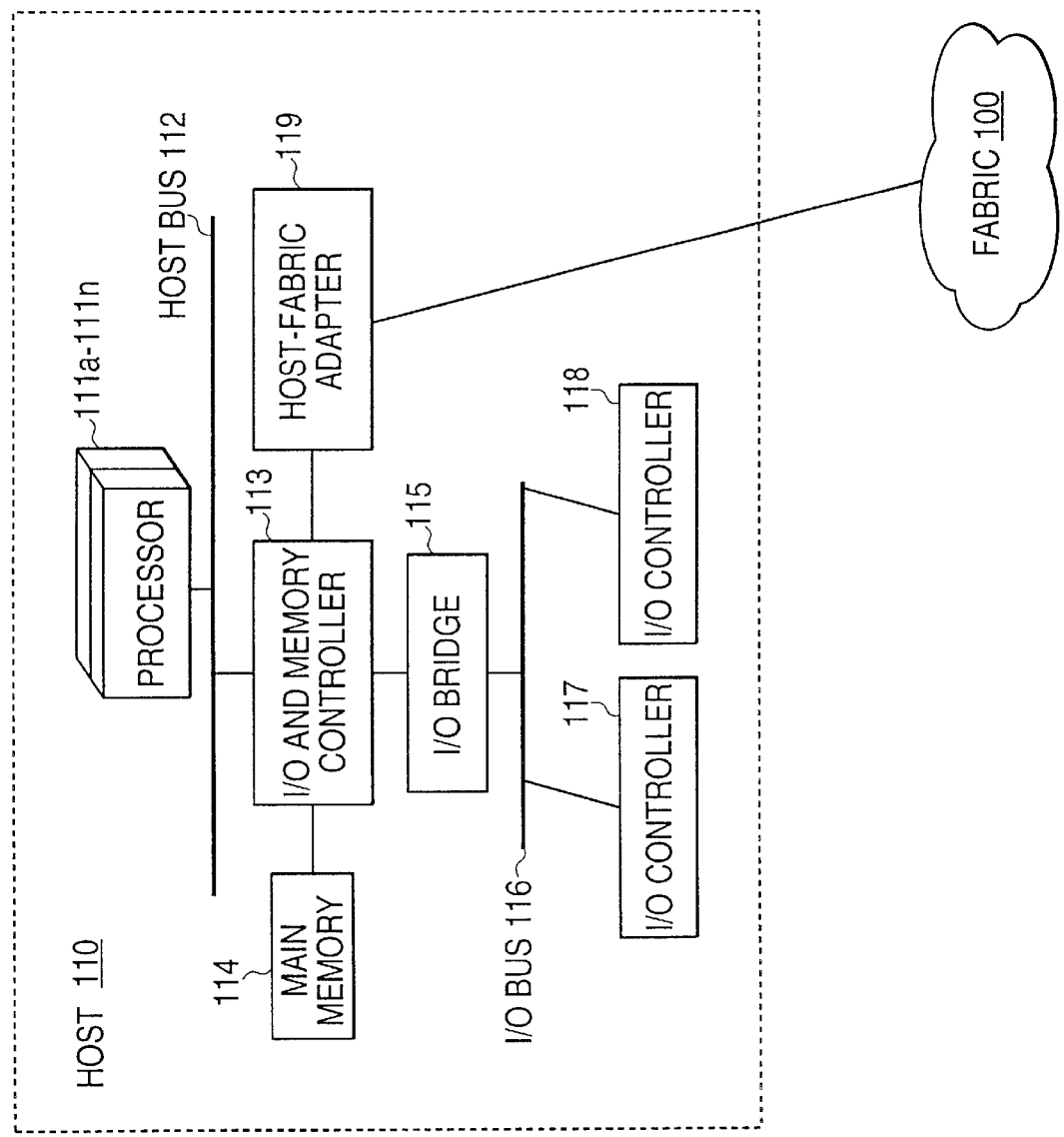
FIG. 1 is a generalized block diagram of a processing system showing one possible implementation of a expansion bridge according to the invention in order to connect the processing system to a data network.

An example application of a fabric channel adapter in a host processing system connected to a data network is shown in FIG. 1. Host processing system 110 may be a multi-processor system, including one or more processors 111a–111n coupled to a host bus 112. Each of the multiple processors 111a–111n may operate on a single item (I/O operation), and all of the multiple processors 111a–111n may operate on multiple items (I/O operations) on a list at the same time. An I/O and memory controller interface 113 (or chipset) is connected to the host bus 112. A main memory 114 may be connected to the I/O and memory controller 113. An I/O bridge 115 operates to bridge or interface between the I/O and memory controller 113 and an I/O bus 116. Several I/O controllers may be attached to I/O bus 116, including I/O controllers 117 and 118. I/O controllers 117 and 118 (including any I/O devices connected thereto) may provide bus-based I/O resources.

Figure 2:
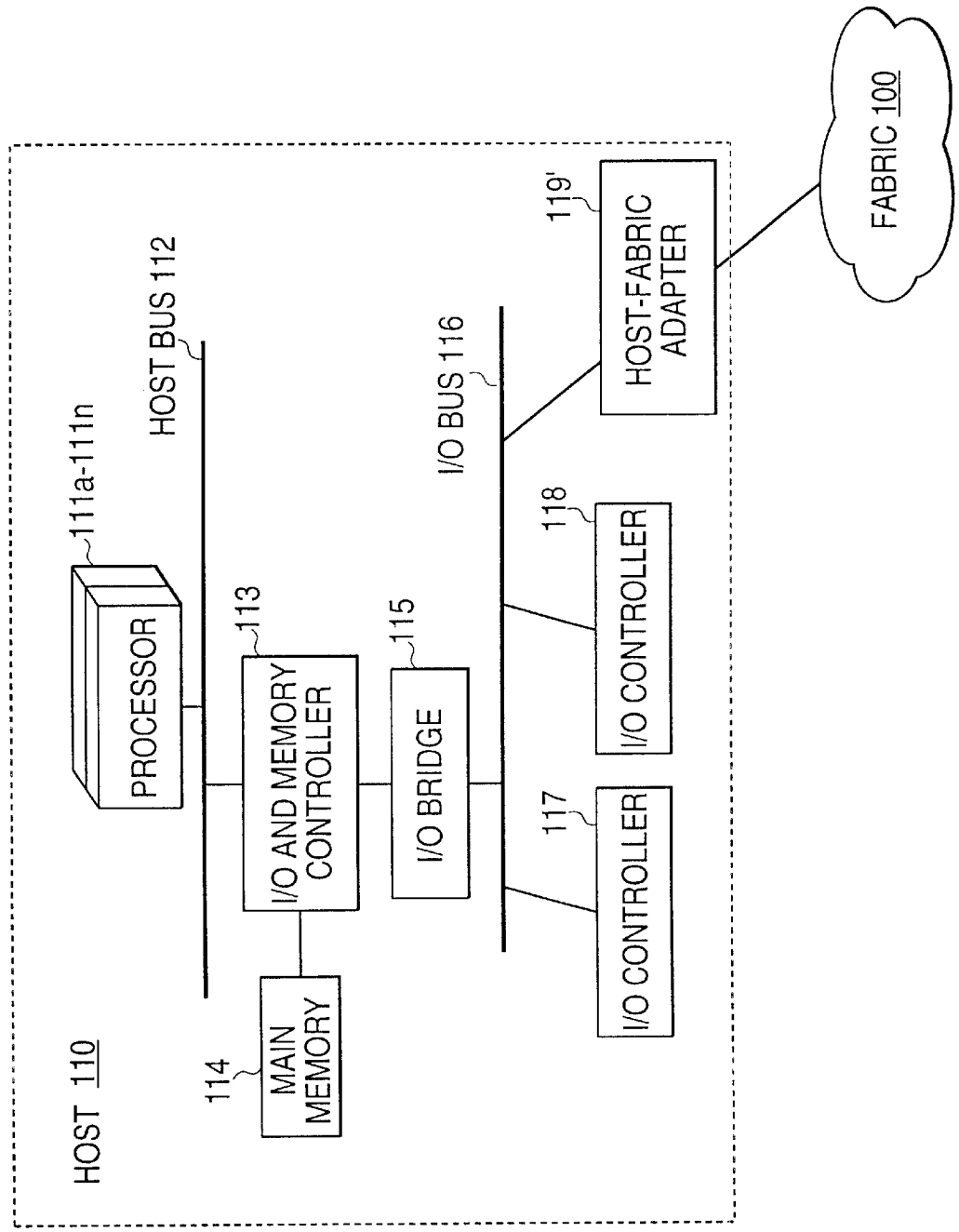
FIG. 2 is a generalized block diagram of a processing system showing a second possible implementation of a expansion bridge according to the invention in order to connect the processing system to a data network.

As shown in FIG. 1, a channel adapter 119 is preferably connected between the I/O and memory controller 113 and the network switching fabric 100. In the event that the I/O and memory controller 113 in any given processing system cannot directly support channel adapter 119, then a channel adapter 119' can be connected to PCI bus via an expansion card as shown in FIG. 2. However, the connection of a channel adapter directly to the I/O and memory controller 113 as shown in FIG. 1 has the advantage of avoiding the afore-mentioned limitations of the I/O bus 116. In either instance, one or more fabric channel adapters may be provided to interface the host system 110 to the network switching fabric.

A software stack may be provided in channel adapter 119 or 119' to access the network switching fabric 100 and information about fabric configuration, fabric topology and connection information. The operating system software (OS) of the processing system 110 may include a fabric bus driver and a fabric adapter device-specific driver utilized to establish communication with a remote fabric-attached agent (e.g., I/O controller) of another processing system connected to the network, and perform functions common to most drivers, including, for example, host-fabric adapter initialization and configuration, channel configuration, channel abstraction, resource management, fabric management service and operations, send/receive I/O transaction messages, remote direct memory access (rDMA) data transfers (e.g., read and write operations), queue management, memory registration, descriptor management, message flow control, and transient error handling and recovery. Such a software driver module may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available for a network administrator to conveniently plug-in or download into an existing operating system (OS). Such a software driver module may also be bundled with the existing operating system which may be activated by a particular device driver.

The example embodiments of the invention described in this application are implemented in a hardware device compliant with the NGIO architecture. The example embodiment and other embodiments of the invention can be implemented in conjunction with other types of switch fabric-based I/O architectures. The example embodiment NGIO uses a similar model for input/output data transfer as is specified by the Virtual Interface (VI) architecture. The VI Architecture enables distributed applications to perform low overhead communication over high-bandwidth, low-latency networks interconnecting nodes within a distributed computer system. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware.

A highly efficient interface, such as the exemplary VI architecture, may be beneficially used by various computer devices having NGIO hardware connected to a network fabric. However, the example embodiment and other embodiments of the invention may also be used with non-NGIO hardware. Such an implementation is but one possible application of the example embodiment which may, of course, be applied in any device having a processor and indeed in any server architecture where an improvement in the speed of communications with a network is desired for whatever reason.

Figure 3:
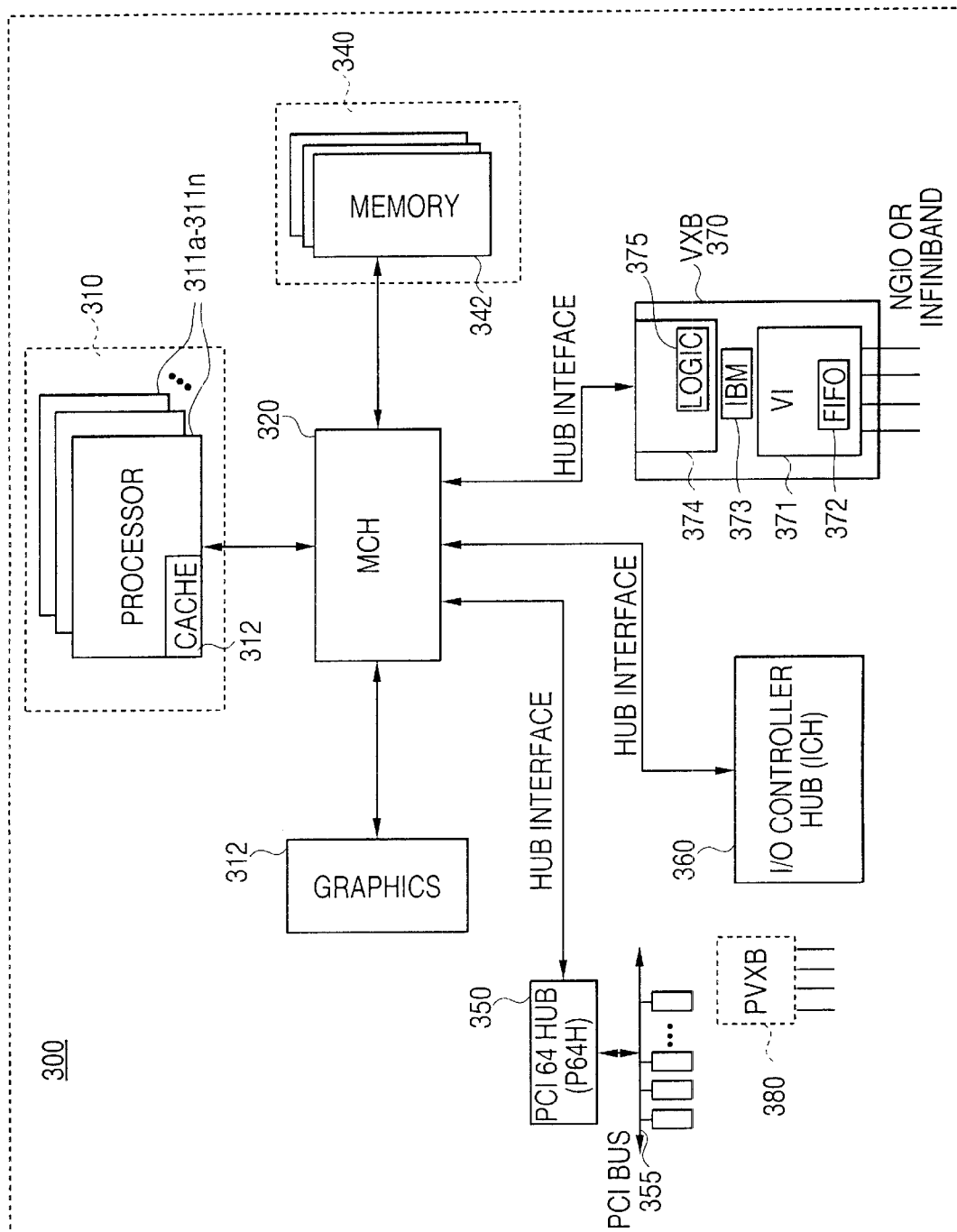
FIG. 3 shows a possible architecture of a host processing system having a virtual interface expansion bridge according to an example embodiment of the present invention.

Attention now is directed to FIG. 3, an example computer system platform having an example virtual interface expansion bridge (VXB) incorporated therein according to the principles of the present invention. As shown in FIG. 3, the computer system 300 may comprise a processor subsystem 310 (which may be comprised of a plurality of processors 311a–311n and at least one cache memory 312), a memory controller hub (MCH) 320 connected to the processor subsystem 310 (such as by a host interface or a front side bus), a graphics subsystem 330 (possibly including a AGP 4× graphics controller, a local memory and a display device such as a cathode ray tube, liquid crystal display, or flat panel display) connected to the memory controller hub 320 by a graphics bus 335 (such as an AGP 2.0 bus), and a memory subsystem 340 storing information and instructions for use by the processor subsystem 310 and having at least one memory element 342 connected to MCH 320 by a memory bus 325. The memory subsystem 340 is preferably a dynamic random-access-memory (DRAM), but may be substituted for read-only-memory (ROM), video random-access-memory (VRAM) and the like. The memory subsystem 340 stores information and instructions for use by the host processors 311*a*–311*n*.

A PCI 64-bit hub (P64H) bridge 350 may be connected to MCH 320 by a dedicated host interface, such as a 16-bit hub interface, for example, and may operate as an interface between MCH 320 and peripheral PCI bus 355. PCI bus 355 may be a high performance 32 or 64 bit synchronous bus with automatic configurability and multiplexed address, control and data lines as described in the latest version of "*PCI Local Bus Specification, Revision* 2.2" set forth by the PCI Special Interest Group (SIG) on Dec. 18, 1998 for add-on arrangements (e.g., expansion cards) with new video, networking, or disk memory storage capabilities. For example, PCI bus 355 may operate at 64-bits and 66 MHz or at 32-bits and 33 MHz. Of course, other types of bus architecture and corresponding bridges, such as Industry Standard Architecture (ISA) and Expanded Industry Standard Architecture (EISA) buses may also be utilized.

There may also be a highly integrated multifunctional I/O controller hub (ICH) bridge 360 connected to MCH 320 by a dedicated host interface, such as a 16 bit hub interface, and to a number of I/O devices, including possibly a PCI bus. A firmware hub and various I/O devices (not shown) may be connected to ICH 360, including for example, Super I/O providing a low pin count (LPC) bus interface with various I/O devices, including a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), universal serial bus (USB) ports, links for audio and telephony code(s), and parallel ports to printers, scanners, and display devices.

The MCH 320, P64H350 and ICH360 may be implemented as a single chipset. Also, the computer system 300 may be configured differently or employ some different components than those shown in FIG. 3.

A VXB 370 according to example embodiments of the invention is also connected to MCH 320 over a dedicated hub interface. Of course, VXB 370 may be connected in other ways in other embodiments of the invention. A VXB according to the example embodiments of the invention may transmit and receive data from either a single network serial link or from a plurality of separate network serial links. VXB 370 in the example embodiment of FIG. 3 is chosen to have four ports configured to receive data from respective NGIO or Infiniband serial communication links. The core of VXB 370 is virtual interface (VI) architecture 371 having at least one 8-byte wide, byte oriented receive first-in-first-out (FIFO) buffer 372 which holds the data from the network link.

While providing high reliability, the VI architecture does not perform other transport level functions, including flow control, buffer management and fragmentation and reassembly. The data from the network serial links are a byte (eight bits) wide and are passed directly into the FIFO buffer(s) 372 of VI 371. The header information is removed from the data packets and the payload data is then passed in byte oriented transaction from VI 371 to a Hub interface (or other host interface) 374 through an in-bound multiplexer (IBM) 373. The transactions include: 1) the payload data; 2) the byte length of the data; 3) a destination address for the data; and 4) the alignment of the data (which byte lane has the first valid byte) in the FIFO buffer(s) 372.

One aspect of the present invention is that VXB 370 receives control information and payload data off the network in byte granularity and converts the payload data into naturally aligned quad-words (64 bits) suitable for transfer over the dedicated host interface. In general, the payload data is destined to main memory. Hub interface 374 of VXB 370 aligns the byte oriented payload data from the network link into naturally aligned quad-words ready for transmission to MCH 320. Specifically, the data in receive FIFO buffer(s) 372 is converted into naturally aligned quad-words according to the byte lane of the first valid payload data and the destination address. The total number of bytes in the payload is calculated for use in the data transfer.

Figure 5:
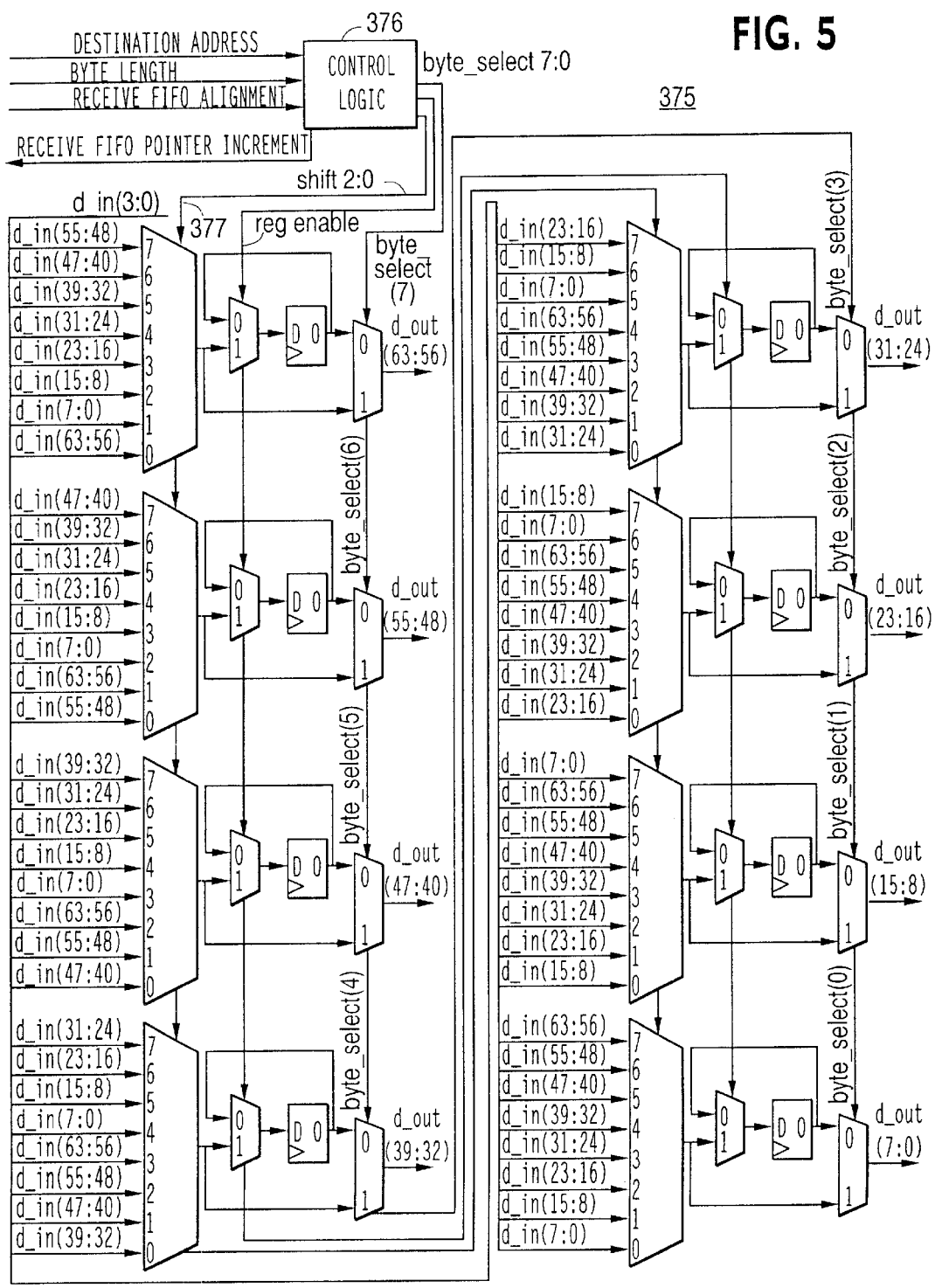
FIG. 5 is a block diagram of the steering logic in the virtual interface expansion bridge according to the example embodiment of the present invention shown in FIG. 3.

A byte steering logic and control circuit 375 in hub interface 374 directly controls the receive FIFO read pointer and generates naturally aligned quad-word outputted to MCH 320. Using the destination memory address and the first valid byte lane, the control logic 376 in byte steering logic and control circuitry 375 outputs a shift signal 377 which shifts the data path of each of the bytes to put the first valid data byte in its naturally aligned location as shown in FIG. 5. If all the data for the quad-word is available in the given line of the receive FIFO 372, the circuitry aligns the quad-word and passes it to MCH 320. Any extra data from the given line of the receive FIFO is latched and held to be merged with the next line of the receive FIFO. If all the valid data for the quad-word is not available in the given line of the receive FIFO, the circuitry latches the valid data from the current line and then outputs a signal incrementing the pointer of receive FIFO 372 to the next line. The latched data is then merged with the new line of data to form the naturally aligned quad-word that is passed to the MCH 320.

VXB 370 also generates byte-enables for partially valid quad-words. The examples in FIGS. 4A–4C illustrate how data is taken from the receive FIFO buffer(s) 372 and passed to MCH 320. The bottom three rows of each figure represent data that is in the receive FIFO buffer(s) 372. The upper eight rows represent data as it passes through the byte steering logic and control circuit 375 logically illustrated in FIG. 5. The low line of data for each clock is the data that is passed through and the upper line of data for each clock represents the data that is in the registers of circuit 375. The shaded data in each figure is the data that is passed to MCH 320. In all cases, MCH 320 receives a naturally aligned quad-word.

In the no-shift example illustrated in FIG. 4A, the destination address is 000b, the byte length is 1100b, and the receive FIFO alignment is 000b. In this case, there is no shifting since byte lane 0 of the receive FIFO is aligned with byte lane 0 of address space. One clock is used to register the entire line of data. Data is registered in this case since it can be done during the same clock cycle. In this example, no bytes are enabled in the first clock, and all bytes are enabled in clocks 1 through 3.

In the example illustrated in FIG. 4B, the destination address is 000, the byte length is 1010b and the receive FIFO alignment is 010b. In this case, data is shifted to the right two byte lanes. In this example, no bytes are enabled in the first clock, all bytes are enabled in clocks 1 and 2, and only bytes 0–5 are enabled in clock 3.

In the example illustrated in FIG. 4C, the destination address is 101b, the byte length is 1000b, and the receive FIFO alignment is 000b. In this case, data is shifted to the left five byte lanes. Also, the first data is taken in clock 0 rather than clock 1 like the previous examples. This is required due to the left shift through the steering logic. In this example, bytes 5–7 are enabled in clock 1, all bytes are enabled in clocks 1 and 2, and only bytes 0–4 are enabled in clock 3.

As illustrated by the example embodiment described above with references to FIGS. 3–5, one advantage of the invention is that it eliminates the need for a naturally aligned FIFO buffer to service a host interface such as a memory controller hub. It presents data from the byte oriented buffer to the host interface as if the data is coming directly from a naturally aligned quad-word FIFO. This is very useful for hub interfaces, such as a hub interface which requires naturally aligned data. Other advantages obtained by circuit 375 include minimum latency for the conversion and scalability to other alignments and granularities.

Another aspect of the invention provides a simple efficient method of converting between naturally aligned granularity counts. It is useful for bus interfaces that operate with or require naturally aligned data, such as a hub interface or F16 bus. It is also useful for message protocols or host interfaces which are different from PCI and other buses at least insofar as they require immediate prior knowledge of the transfer length at the beginning of the data transfer.

The example embodiments of the invention use host interfaces requiring prior knowledge of the transfer length of a data transfer at the beginning of that data transfer. The host interface typically uses naturally aligned data and a message based protocol where there is a message sequence. A message sequence is a combination of a message request and a message completion. Each message request has a header with control information that describes the message. In the example of a data transfer, the transfer length can be indicated by dword count values calculated and included in the header of a Hub interface message. There will typically be some amount of payload data immediately behind the header.

With the transfer length, a calculation can be made of the number of hub interface common clocks required to complete the data transfer. From the beginning and during the data transfer, each side of the interface counts down the hub interface clock cycles during the data transfer and automatically ends the data transfer at the same time. The example embodiment provides a simple generic method for converting data counts from one granularity to any wider granularity (i.e., convert from a byte count to a dword count). The only limitation on the method is that all granularities involved must be some power of 2 bytes wide.

Figure 6:
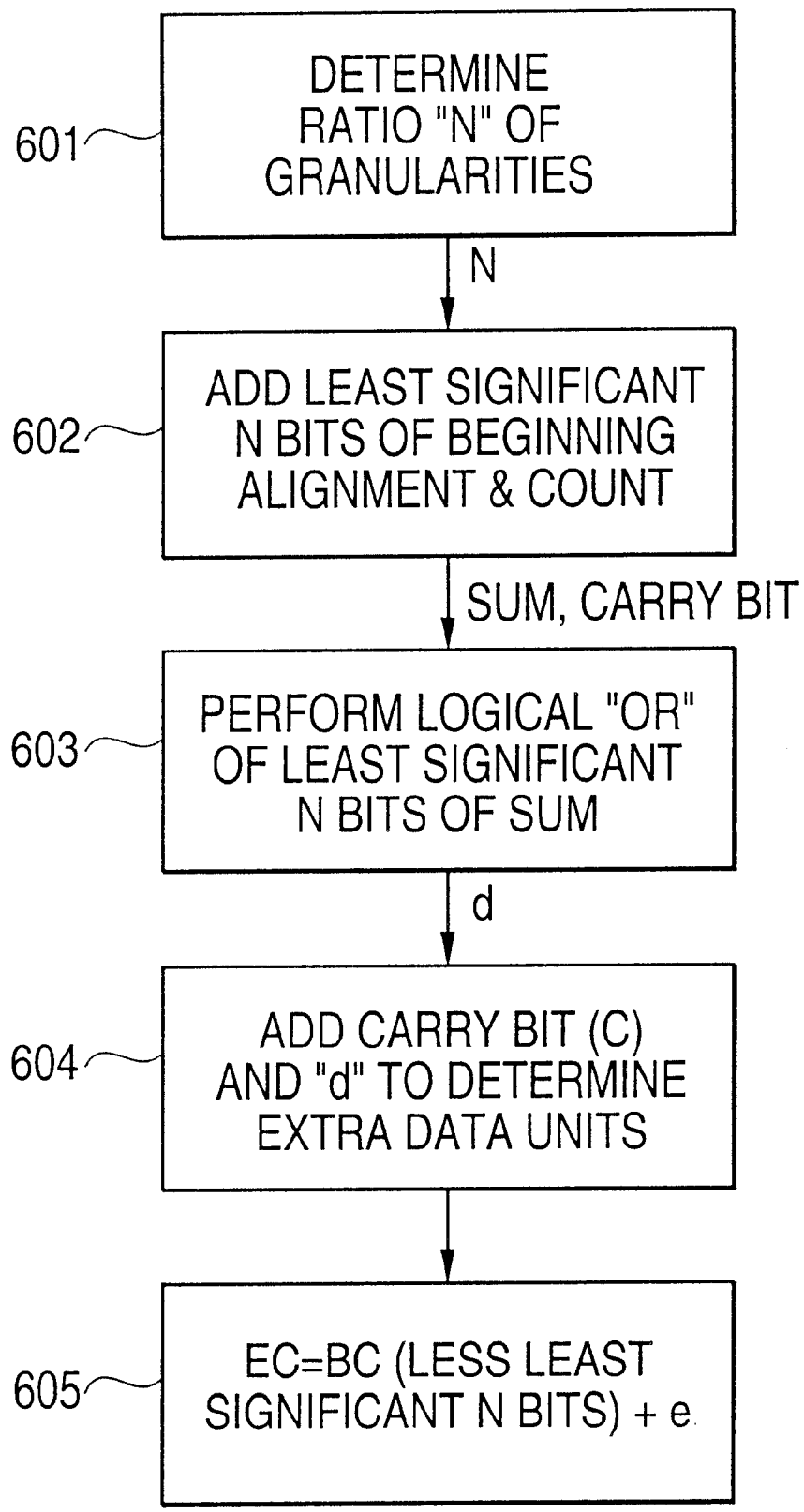
FIG. 6 is a flowchart of an algorithm used in a virtual interface expansion bridge according to a second example embodiment of the invention.

A flowchart of an algorithm utilized in the example embodiments of the invention is illustrated in FIG. 6. A software program carrying out a method according to this algorithm may be stored in the interface 375 of VXB 370 in the example embodiments of the invention. However, the method is not restricted in its application to a VXB and a computer program to execute the method may be stored in any suitable tangible medium. At step 601, the invention determines what power of 2 is between the beginning and ending granularities according to the equation $n = \log_2(EG/BG)$ where EG is the Ending Granularity (granularity to be converted to) and BG is the Beginning Granularity (granularity to be converted from). For example, for byte to dword conversion n=2, since dwords are 4 times as wide as bytes and $2^2 = 4$.

Then, the least significant n bits of the beginning alignment BA (alignment of first valid data in the ending granularity) and the least significant n bits of the beginning count BC (number of data units in the beginning granularity) are added (step 602). The least significant n bits of the sum are called s and the carry bit of the sum is called c. The value d is obtained by performing a logical "OR" of all the bits of s (step 603).

The sum of c and d (called e) is the number of extra final data units that must be added to the truncated beginning count BC (step 604). If the data does not cross an ending alignment boundary, then the ending count EC (number of data units in the ending granularity) is 1. If the data does cross an ending alignment boundary, then the ending count (EC) is equal to the beginning count (BC) with the least significant n bit truncated off plus e (step 605).

FIG. 7 explains the implications of the values of c and d. When c and d are both equal to zero, both ends of the incoming stream are naturally aligned with the final granularity. When c is equal to zero and d is equal to 1, both ends of the incoming data stream are mis-aligned with the final granularity and the sum of the beginning data units that overlap the ends of the data stream is equal to or greater than the ending granularity. When c is equal to one and d is equal to zero, the incoming data stream starts mis-aligned with the ending granularity but ends up misaligned. When c is equal to 1 and d is equal to 1, both ends of the incoming data stream are mis-aligned with the final granularity and the sum of the beginning data units that overlap the ends of the data stream is less than the ending granularity. FIGS. 8A–8D go through the implications of the values of these two bits for the 4 possible cases described in FIG. 7.

The invention is not limited to a host processing system having an architecture as illustrated in FIG. 3. Indeed, an advantage of the invention is that it may be useful and widely adaptable to many data bridges. For example, although it is preferred that a VXB connect directly to a memory controller hub as shown in FIG. 3, it may also be implemented as a PCI Virtual Interface Expansion Bridge (PVXB) connected to a PCI bus as exemplified by PVXB 380 in FIG. 3 or to a PCI-X bus (not shown) where interface 375 is replaced with an interface appropriate for the PCI or PCI-X bus. For example, the granularity of the incoming data can be converted as described above so that it has the granularity appropriate for transfer over a PCI or PCI-X bus. In particular, a VXB is provided as a single silicon integrated circuit chip in which a number of respective interfaces are contained so that manufactured quantities of the same silicon die can be implemented for use with any interface by changing the die and pin connections on the chip.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of converting data from a first granularity to a second granularity different than the first granularity, said method comprising:

determining the ratio "n" of the second granularity of the data to the first granularity of the data as a power of 2;

adding the least significant n bits of the beginning alignment of the data and the least significant n bits of the beginning count of the data, the carry bit of the sum being designated as "c";

performing a logical "OR" of the bits of the resulting sum to obtain a value designated as "d"; and adding a number of data units to the data, said number of data units being equal to the sum of "c" and "d".

2. The method recited in claim 1, wherein the method converts the granularity of data received from a network serial link.

3. The method recited in claim 2, wherein the data of the first granularity is a byte.

4. The method recited in claim 3, wherein the data of a second granularity is provided to a host interface of a processing system.

5. A computer program stored in a tangible medium, said program, when executed, carrying out a method of converting data from a first granularity to a second granularity different than the first granularity, said method comprising:

determining the ratio "n" of the second granularity of the data to the first granularity of the data as a power of 2;

adding the least significant n bits of the beginning alignment of the data and the least significant n bits of the beginning count of the data, the carry bit of the sum being designated as "c";

performing a logical "OR" of the bits of the resulting sum to obtain a value designated as "d"; and adding a number of data units to the data, said number of data units being equal to the sum of "c" and "d".

6. The computer program recited in claim 5, wherein the method converts the granularity of data received from a network serial link.

7. The method recited in claim 6, wherein the first granularity is a byte.

8. The method recited in claim 7, wherein the data of a second granularity is provided to a host interface of a processing system.

* * * * *